J. T. MELEADY.
OUTLET BOX.
APPLICATION FILED MAY 20, 1908.
938,682.
Patented Nov. 2, 1909.
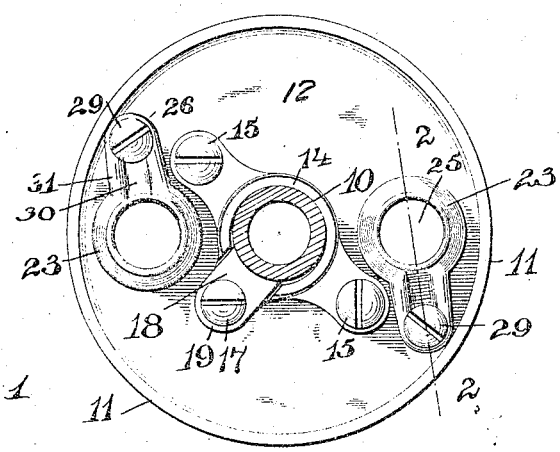
Fig. 1
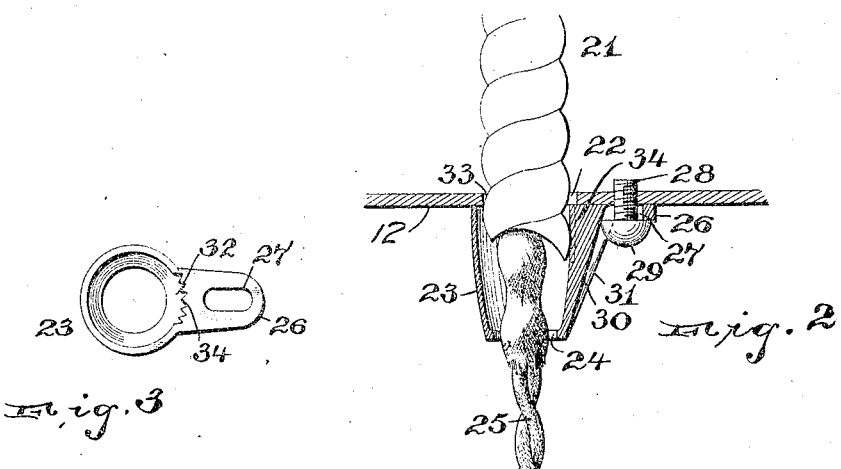
Fig. 3
Fig. 2
WITNESSES:
M. A. Johnson.
E. A. Pell
INVENTOR
James T. Meleady
BY
Wm. H. Canfield
ATTORNEYS

UNITED STATES PATENT OFFICE.

JAMES T. MELEADY, OF NEWARK, NEW JERSEY.

OUTLET-BOX.

938,682.  Specification of Letters Patent.  Patented Nov. 2, 1909.

Application filed May 20, 1908. Serial No. 433,807.

*To all whom it may concern:*

Be it known that I, JAMES T. MELEADY, a citizen of the United States, residing at Newark, in the county of Essex and State of New Jersey, have invented certain new and useful Improvements in Outlet-Boxes; and I do hereby declare the following to be a full, clear, and exact description of the invention, such as will enable others skilled in the art to which it appertains to make and use the same, reference being had to the accompanying drawings and to figures of reference marked thereon, which form a part of this specification.

This invention relates to an outlet-box adapted to be used on electrical or combination fixtures, and refers to means for securing the conduits conducting the wires to the outlet-box, this fastening means exerting a transverse pressure to secure the conduits to the outlet-box, but the fastening means exerting the transverse pressure being operated longitudinally or parallel with the conduits so that the securing means is easily accessible.

The invention is illustrated in the accompanying drawing, in which—

Figure 1 is a view looking into an outlet-box of my improved construction. Fig. 2 is a section on line 2, 2, in Fig. 1. Fig. 3 is a plan view of the fastening means shown in Fig. 2.

I illustrate, in this case, a suitable support 10 which is a pipe either supporting a combination fixture, in this case being a gas pipe, or being simply an electrical fixture. The outlet-box 11 fits into the plaster on the wall of the apartment and is preferably cup-shaped, having a flat plate portion 12 which is provided with an opening through which the support 10 is adapted to pass. A thimble 14 is secured by the screws 15 to the outlet-box, the thimble having its opening placed approximately in line with the opening 13 of the outlet-box and having an extension to one side, which extension is adapted to receive a screw 17. A wedge-shaped block 18 has a flange 19 engaged by the head of the screw 17, and when the screw 17, which is parallel with the support 10, is screwed down it causes the beveled face of the wedge 18 to engage a beveled surface of the thimble 14, and this causes a binding of the support 10 against the opening in the thimble, thus causing the outlet-box to be slightly eccentric to the support, and in this way binding the parts tightly together to support the outlet-box in place. It will be noticed that the screw 17 is parallel with the support 10 and can be easily operated by means of a screw-driver, which is not true when a transverse screw of the ordinary thumb-screw type is installed. Any other usual form of means for securing the outlet-box in place can be used.

In order to secure the conduits 21, which are of the usual form having the convolutions forming helices, I provide the openings 22. A sleeve 23 is adapted to go over the opening 22, each sleeve 23 having a perforation 24 through which the wires 25 are permitted to pass. The sleeve 23 has a substantially radial lug 26 which has a slot 27 therein, which slot receives a screw 28, the head 29 of the screw, when the screw is screwed down into place, bearing against the inclined surface 30 and also against the strengthening ribs 31, this movement of the screw in the direction or parallel with the axis of the support and of the conduits, forcing the sleeve 23 eccentric to the opening 22, thus throwing the edge 32 of the sleeve 23 against one side of the conduit, and forcing the other side of the conduit in engagement, as at 33 in Fig. 3, with the edge of the opening 22. This securely locks the conduit against withdrawal, and in this case also it will be noticed that the means for causing the transverse motion of the fastening means has a movement and is operated in a direction parallel with the support of the outlet-box, and also substantially parallel with the element to be supported. To prevent the conduits 21 from becoming unloosened by a rotating or spiral movement, I provide the edge 32 with teeth 34, which teeth enter, slightly, the soft lead or similar material of which the conduits are made, and lock them against any rotation whatever.

This outlet-box is preferably made cup-shaped, and is struck up preferably from sheet metal.

Having thus described my invention, what I claim is:—

The combination of a conduit with an outlet box, the outlet box having a perforation for receiving the conduit, a sleeve on the outlet box and embracing the conduit, said sleeve being provided with a radial lug having a radial slot and an inclined face, a screw passing through the slot and into the box, and inclined ribs flanking the inclined face to form a channel for the head of the screw for forcing the sleeve and conduit eccentric to the perforation in the outlet box to bind the conduit therein.

In testimony, that I claim the foregoing, I have hereunto set my hand this 19th day of May 1908.

JAMES T. MELEADY.

Witnesses:
WM. H. CAMFIELD,
E. A. PELL.